United States Patent [19]
Corcoran

[11] Patent Number: 5,326,139
[45] Date of Patent: Jul. 5, 1994

[54] COUPLING DEVICE FOR BRANCH POINTS ON A PIPE

[76] Inventor: Daniel P. Corcoran, 4871 Appletree La., Bay City, Mich. 48706

[21] Appl. No.: 941,896

[22] Filed: Sep. 8, 1992

[51] Int. Cl.[5] .......................... F16L 5/00; F16L 41/00
[52] U.S. Cl. .................................. 285/197; 285/209; 285/210; 29/890.148
[58] Field of Search ............... 285/197, 206, 208, 209, 285/210, 161; 29/890.148

[56] References Cited

U.S. PATENT DOCUMENTS

| D. 288,116 | 2/1987 | McLennan et al. | D23/7 |
| 377,506 | 2/1888 | Whiter . | |
| 978,504 | 12/1910 | Stewart | 285/209 |
| 1,049,283 | 12/1912 | Westphal . | |
| 1,355,450 | 10/1920 | Carlson . | |
| 3,033,514 | 5/1962 | Grosch | 251/145 |
| 3,716,257 | 2/1973 | Hackman et al. | 285/210 |
| 3,981,061 | 9/1976 | Jackson et al. | 285/197 |
| 4,637,638 | 1/1987 | Rush et al. | 285/197 |

FOREIGN PATENT DOCUMENTS 955019  1/1950  France ............................. 285/209

Primary Examiner—P. Austin Bradley
Assistant Examiner—Jeffrey T. Knapp
Attorney, Agent, or Firm—Robert L. McKellar

[57] ABSTRACT

This specification discloses a coupling device which is capable of being inserted into an opening of a pipe to form a branch point in the pipe. The device allows for the use of an inexpensive gasketing system and the device is configured such that it will not significantly impede the flow of liquid to the branch point or allow rotation or turning in the opening of the pipe.

3 Claims, 2 Drawing Sheets

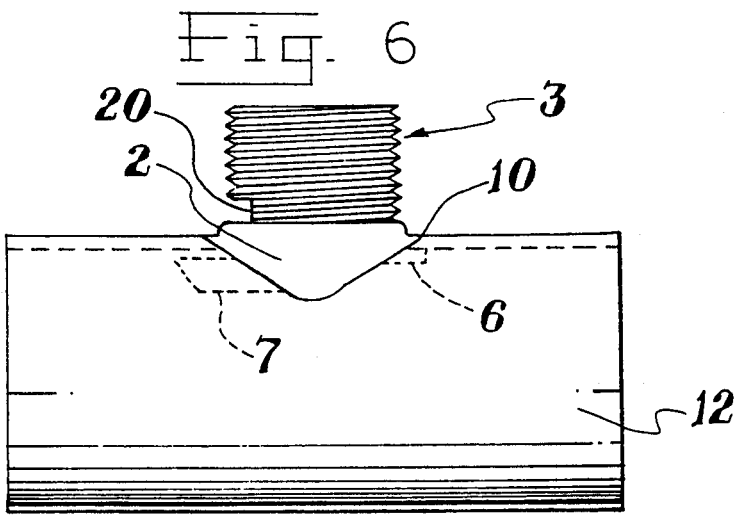
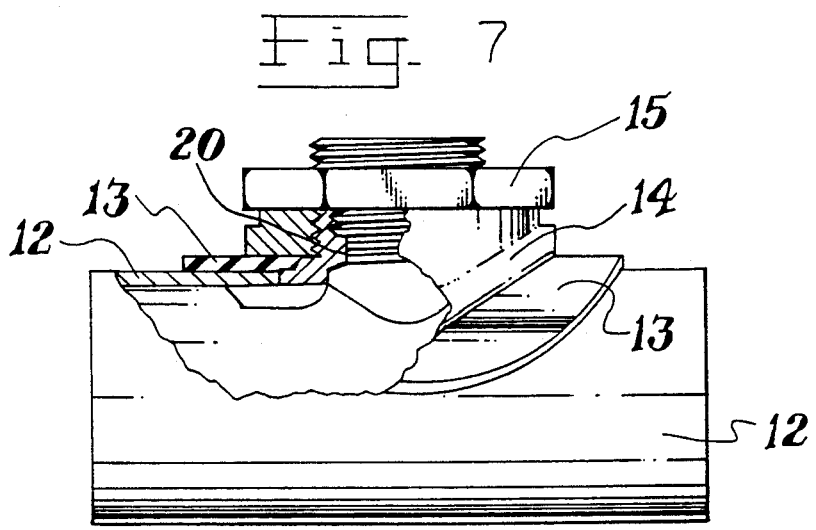
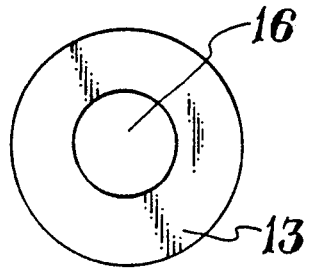 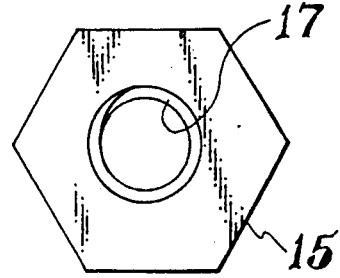 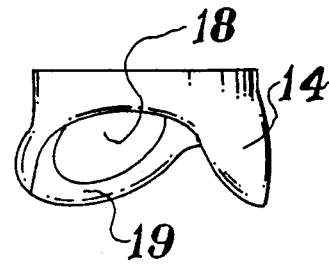

COUPLING DEVICE FOR BRANCH POINTS ON A PIPE

The invention disclosed herein deals with a coupling device for providing a branch point on a main pipeline. Devices that have been developed for providing branch points on a main pipeline have been available since at least the turn of the 20th century.

These devices are to be distinguished from the normal pipe coupling devices wherein the object of the coupling devices is to couple together the ends of two separate pieces of pipe to form a main pipeline.

BACKGROUND OF THE INVENTION

The devices of the branch type have in common the fact that they are designed to be inserted into an opening in a main pipeline to provide a point at which the pipeline can be branched without having to shut down the pipeline and open it to insert a tee or the like.

The variety of devices to which this invention pertains is the "heel and toe" rocking insertion device, in which projections on the device, which, along with the device itself, are collectively longer than the widest diameter opening in the main pipeline. They are first rocked backward such that a first lug can enter the opening, and then the device is moved forward so that the second lug can be set down into the opening, whereupon the device is then centered in the opening and the inserted lugs can grasp the interior wall of the main pipeline and be used to lock the device into place when a threaded locking means is utilized.

Such "heel and toe" devices are common in the art but those currently available suffer from many problems which hinder their use.

Such devices can be found, for example, in U.S. Pat. No. 377,506, issued Feb. 7, 1888 to Whiter, in which there is disclosed a coupling for boiler tanks, and the like. This coupling is designed to be inserted into a hole in the boiler plate. The design of the device is such that it is shouldered at the point that it meets the interior edge of the hole in the pipe in order to prevent the device from rotating or turning in the hole. The locking means is shown therein as "D" and it should be noted that there is no provision for allowing the coupling to be a branch point, i.e. there are no threads on the external surface of the device. Further, it should be noted that the device extends significantly into the interior of the boiler tank, which would not be of great benefit if the device were to be used as a branch point in a main pipeline as it would tend to significantly interfere with the flow of the liquid being passed through the main pipeline.

In a further disclosure, Westphal, in U.S. Pat. No. 1,049,283, issued Dec. 31, 1912, there is shown a pipe joint that is similar to the Whiter device, in that it is designed to be used in a boiler tank. It is noted that the lugs are so designed that they can have, in one embodiment, inclined surfaces in order to engage the interior edges of the hole in the tank plating. This device also projects into the interior of the tank and makes no provision for the passage of liquid if used in a main pipeline.

In U.S. Pat. No. 1,355,450, issued Oct. 12, 1920, there is shown a device similar to the Whiter and Westphal devices, which is a device for use in a tank or the like. It is designed with a rather large, deep notch in one side of the coupling. This notch allows the coupling to be slipped into the opening in the tank plating, and then allows the coupling to be moved sideways in order to move the rest of the device into the opening. With the device in place, there is placed thereon, a packing ring, and then a collar. The collar is designed with enough length to fit down over the notch and cover it so that the fitting remains leakproof. The collar is then compressed down over the packing ring by the used of a threaded nut. It should be noted that the bottom of the device is designed with an elongated lug 3 which will help retain the device in the opening. However, the elongated lug 3 provides a barrier to the free flow of liquid if it were to be used in a main pipeline. Further, the device does not seem to have any means of controlling the rotation or turning of the device in the opening.

A device similar to the Carlson device is shown in U.S. Pat. No. Des. 288,116, issued Feb. 3, 1987.

A unique design in irrigation gate valves is shown in U.S. Pat. No. 3,033,514, issued May 8, 1962, in which there is shown a device having an enlarged apron portion which extends tangentially from a semicircular portion and projects to one side of the body a distance substantially equal to the radius of the axial opening in the body portion. This value is designed such that it will not turn or rotate in the opening. However, the device projects significantly into the pipeline such that it would significantly slow the passage of liquid through a pipeline. Further, this device must use a thickened, contoured gasket in order to be effectively leakproof.

Finally, there is shown in U.S. Pat. No. 3,981,061, issued Sep. 21, 1976 to Jackson, et al., a method for joining pipes, in which the device used to do that is shown as having a pair of lugs on its bottom, an indented neck portion for use in inserting the device in an opening in a main pipeline, a thickened, contoured gasket, a collar, a locking means, which is a locking nut which threads around the center pipe of the device and locks the whole together by depending on the lugs that have been inserted into the interior of the main pipeline.

This device is similar to the device of the instant invention. However, the device of the instant invention differs significantly by way of the following.

The device of the instant invention has two pair of lugs which are set out to the side of the device such that the middle of the device is open to allow minimal interference with the flow of liquid in the main pipeline, while the device of the '061 patent is constructed with essentially a full circle at the bottom which does cause interference with the flow to the branch point. Also, the lugs of the instant invention are designed as part of the saddle-shaped member of the device so that they do not project significantly down into the opening of the main pipeline, while the lugs of the '061 patent project significantly into the pipe opening and tend to impede the flow of liquid therein.

The device of the instant invention allows the use of an inexpensive flat washer while the device of the '061 patent requires a thickened, contoured gasket in order for the device to be effective. In other words, the device of the instant invention because of its saddle-shaped configuration, essentially mates with the inside edges of the opening of the main pipeline and and essentially fills the opening, thus, one does not need to use a thickened, contoured gasket in order for the device of the instant invention to work properly. Further, the device of the '061 patent requires an alignment tool for adapting the device to the main pipeline, and for centering the device in the opening in the main pipeline, while the device of the instant invention does not require such an alignment device. The device of the instant invention is configured such that the saddle-shaped member automatically aligns the device in the opening.

Finally, all of the features of the instant device can be had much more economically manfactured than the device of the '061 patent.

THE INVENTION

The device of the present invention overcomes the problems of the prior art devices and allows the implementation of a branch point in a main pipeline with the benefits of low internal profile of the device within the main pipeline to aid in the flow of liquid to the branch point; non-leaking seal without the use of expensive gasketing; self-aligning of the device in the opening of the main pipeline, and non-rotation and non-turning in the opening.

With more specificity, this invention comprises a coupling device capable of being inserted in an opening of a pipe to form a branch point in the pipe. The device comprises a stem pipe, a flat gasket, a collar, and a locking means. The stem pipe is comprised of an enlarged saddle-shaped base member with a hollow stem integrally surmounted on it in which the hollow stem has a notch near its base.

The hollow stem is threaded on its exterior surface and the enlarged saddle-shaped base member has a top surface which is configured to mate with the interior edges of any opening formed in the main pipe. The enlarged saddle-shaped base member has a bottom surface bearing two pair of integral lugs wherein the lugs are extending from diametrically opposed points on the saddle-shaped base member. The pairs of lugs are located away from the center of the saddle-shaped base member.

One of the pairs of lugs is longer than the other pair of lugs along the diametric linear axis of the pipeline which is also the linear axis of the coupling. The enlarged saddle-shaped base member is surmounted by a flat gasket. The gasket has a center hole in it to accommodate the hollow stem that projects through it. The gasket is surmounted by a saddle-shaped collar which coincides with the outside curvature of a main pipe with the gasket in between the saddle-shaped collar and the pipe itself. The saddle-shaped collar is surmounted by a threaded locking means which is engageable with the exterior threaded surface of the hollow stem whereby, when the locking means is progressively engaged with the hollow stem, said locking means draws the saddle-shaped base member towards the main pipe edges bringing both pair of lugs, the gasket, and the collar into a compressive bearing relationship to the main pipe.

This invention further deals with a combination, said combination including a main pipe having an opening through it's wall, a stem pipe having an exterior threaded surface, a flat gasket, a collar, and a locking means, such that when the stem pipe is inserted in the opening in the main pipe, the stem pipe is surmounted with a flat gasket; the flat gasket is surmounted by the collar; the collar is surmounted by the locking means, which locking means is engageable with the exterior threaded surface of the stem pipe, and the locking means is progressively engaged with the hollow stem, said locking means draws the saddle-shaped base member towards the main pipe edges bringing the lugs, the gasket, and the collar into a compressive bearing relationship to the main pipe.

Yet a further aspect of this invention is a method of attaching a coupling device capable of being inserted in an opening of a pipe to form a branch point in the pipe, said coupling device comprising: a stem pipe, a flat gasket, a collar, and a locking means, said stem pipe comprising a stem pipe, a flat gasket, a collar, and a locking means, said stem pipe comprising an enlarged saddle-shaped base member and a hollow stem integrally surmounted thereon; said hollow stem being threaded on its exterior surface; said saddle-shaped collar being surmounted by a threaded locking means which is engageable with the exterior threaded surface of the hollow stem, wherein the method comprises the steps of:

(I) inserting the longer lugs of the saddle-shaped base member into the pipe opening; (ii) positioning the stem pipe in the pipe opening by moving the stem pipe against the edge of the pipe opening near the location of the longer lugs on the saddle-shaped base member such that the notch engages the edge of the pipe in the opening; (III) inserting the shorter lugs of the saddle-shaped base member into the pipe opening; (IV) while maintaining the stem pipe in the main pipe opening: (i) surmounting the stem pipe with the flat gasket; (ii) surmounting the flat gasket with the collar; (iii) surmounting the collar with the locking means by engaging the locking means with the stem pipe threaded exterior surface and (V) progressively engaging the hollow stem, whereby the said locking means draws the saddle-shaped base member towards the pipe edges bringing the lugs, the gasket, and the collar into a compressive bearing relationship to the pipe, whereby a branch point in the main pipe if formed.

BRIEF DESCRIPTION OF THE DRAWINGS

FIG. 6 is a side view of FIG. 5 showing the lugs in phantom.

FIG. 7 is a partially fragmented side view of the combination of this invention with all of the components in place.

FIG. 8 is a top view of a flat gasket useful in this invention.

FIG. 9 is a top view of a locking means of this invention.

FIG. 10 is an isometric view of the collar of this invention.

DETAILED DESCRIPTION OF THE INVENTION

Figure 1:
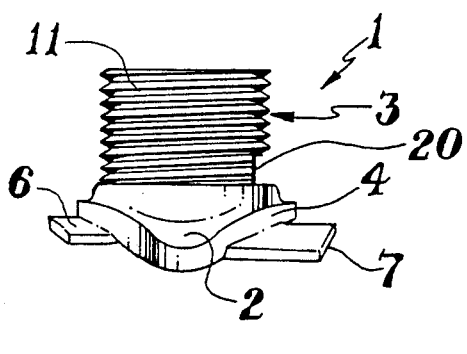
FIG. 1 is a side view of the stem pipe of this invention showing the relative size of the two pairs of lugs.

This invention deals with a coupling device which has as one of its component parts a stem pipe 1, as shown in FIG. 1. The stem pipe 1 is the critical part of this invention as will be determined by reference to the following. The stem pipe 1 is comprised of two cental elements, namely, an enlarged saddle-shaped base member 2 and a hollow stem 3. With regard to FIG. 1, it can be observed that the stem pipe 1 is a unitary element and is preferably manufactured from metals. The stem pipe 1 has a thread 11 on its exterior surface to accommodate a threaded nut which will be defined infra. The hollow stem pipe 1 is also has a thread 9 on its interior surface (see cf. FIG. 2 where the interior thread 9 is shown in phantom) for use to equip the branch point with, for example, a sprinkler head, or a further threaded pipe to create a branched pipeline. The saddle-shaped base member 2 is configured both internally and externally as a saddle shape. The internal configuration is designed to interface with the outside curvature of any main pipeline onto which the device of this invention is to be installed. The exterior configuration is, of course, designed to save weight, and also to follow the form of the internal configuration in order to form walls which can capture the gasket of this invention, which gasket will be discussed infra.

The outer perimeter of the saddle-shaped base member 2 is configured such that it will sit in the opening 10 of a main pipeline (see FIG. 6) such that its side walls 4 will align with and mate with the inside edges of the opening 10. This design is such that the saddle-shaped base member 2 conforms to the slug that is cut from the wall of the pipe 12 (see FIG. 5 where the opening 10 is shown in phantom and the base just fits that opening) to make the opening 10, and as such, the saddle-shaped base member 2 fits quite closely in the opening thus preventing any rotation or turning in the opening 10 once installed (see also FIG. 6). This configuration thus prevents one from having to especially design and machine a part on the neck of the stem for such use thereby eliminating a very expensive part of the manufacture of such devices. It also helps in providing really close tolerances such that expensive gasketing does not have to be used and therefore, simple gasketing, such as an inexpensive flat rubber gasket can be used.

Figure 2:
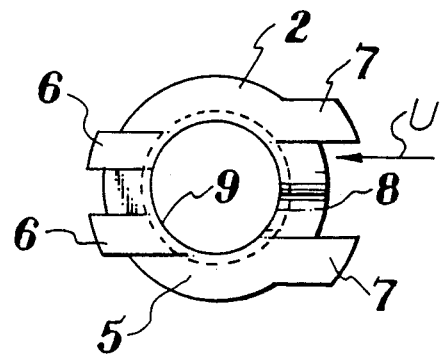
FIG. 2 is a bottom view of the stem pipe of this invention showing the placement of the lugs on the bottom.
Figure 3:
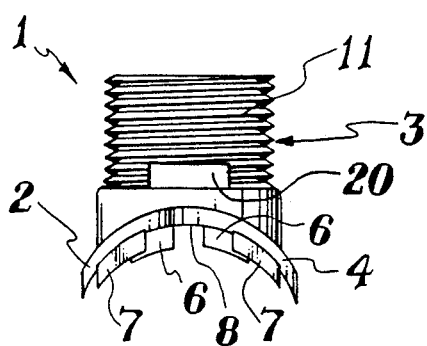
FIG. 3 is a front view of the stem pipe of this invention looking from upstream of the direction of liquid flow through a pipe to which the device of this invention is connected.
Figure 4:
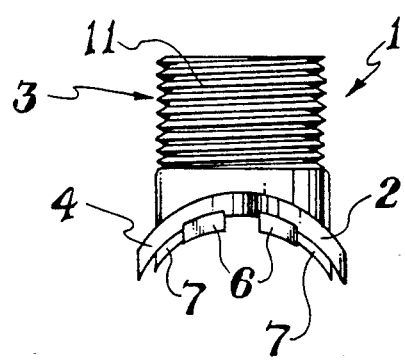
FIG. 4 is a back view of the stem pipe of this invention looking from downstream of the direction of liquid flow through a pipe to which the device of this invention is connected.

The bottom surface 5 as shown in FIG. 2 has mounted integrally thereon two pairs of lugs, i.e. a short pair 6 and a longer pair 7, said "short" and "long" being relative to the lugs themselves, as one pair is required to be shorter than the other pair in order for this device to work as it does, the designation "short" and "long" being relative to their positioning which is at diametrically opposed points on the saddle-shaped base member 2. Lugs 7, it will be noted are not only longer, but they are wider. However, the lugs 7 are spaced apart and along the edges of the saddle-shaped base member 2 such that a wide opening 8 is created at the center of the stem pipe 1 and between the lugs 7. This wide opening 8 is a means of allowing the flow of liquid to the hollow stem 3 of the device without essentially any impediment. Thus, when the device is put into place in a pipe 12, the lugs 7 should be aligned against the flow of the liquid therein.

The short lugs 6, it will be noted are not only shorter, but are narrower than the lugs 7. Since these lugs are on the downstream side of the liquid flow across the branch point, the lugs 6 need not be widely spaced apart like the lugs 7. Further, since this is the case, it is fitting that these lugs 6 also be shorter such that they allow, in conjunction with the notch 20 in the base of the hollow stem 11, the insertion of the device into the opening of the main pipe 12 with ease, but without detracting from the ability of the device to be safely secured in the pipe 12.

Both pairs of lugs 6 and 7 are thick enough to be strong enough to hold the device in place. However, when the thickness of the lugs 6 and 7 is kept to a minimum, the impediment of the liquid to the stem pipe is kept to a minimum.

Figure 5:
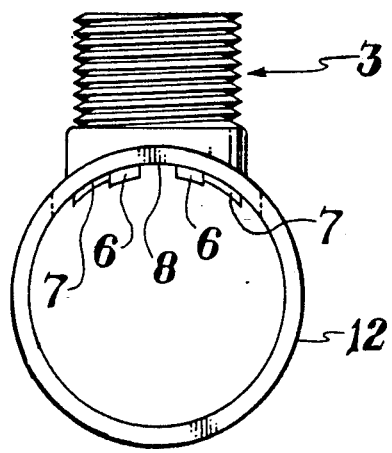
FIG. 5 is an end view of the stem pipe of this invention in place in an opening of a pipe, it being noted that the other parts of the combination are not shown for clarity.

FIG. 5 illustrates an end view of the stem pipe 1 in place in the opening 10 of the pipe 12 showing the lugs 7, the lugs 6, the hollow stem 3, and the wide gap 8, all without the other elements of the combination in place.

FIG. 6 illustrates a side view of the stem pipe 1 in place in the opening 10 of the pipe 12 and also shows one of the lugs 7 and one of the lugs 6, and the inside surface of the pipe 12 in phantom.

FIG. 7 shows a full side view of the combination of this invention showing the device in place in a pipe 12. Thus, there is shown the pipe 12, the flat gasket 13 conformed and compressed to the outside surface of the pipe 12 by the collar 14, a locking nut 15 and the hollow stem 3 with its threads 11.

FIG. 8 is a top view of a flat gasket 13 useful in this invention, wherein there is shown the hole 16 in the gasket 13 to accommodate the hollow stem 3.

FIG. 9 is a top view of the locking means 15 of the invention wherein there is shown the threaded interior 17, which is engageable with the exterior threads 11 of the hollow stem 3. The locking means 15 is essentially flat and is usually manufactured from metals.

Finally, there is shown in FIG. 10 an isometric view of the collar 14 of this invention with its saddle-shaped sides 19 and a hole 18 centered therein to accommodate the hollow stem 3 when the collar 14 is placed thereover. The collar 14 is not threaded in the interior of the hole 19 and the fit over the hollow stem 3 should be with close tolerances, at least such that there is very little sideways movement of the collar 14.

With regard to the method of use of the device of this invention, it should be noted that the lugs 6 and 7 are designed such that the rocking movement in use in the art to install such devices, is a similar movement that is needed to accommodate the method of this invention.

Thus, the pipe 12 is prepared by creating a round hole through its side wall at the point that one wishes to create a branch point in the pipe. Thereafter, the stem pipe 1 is rocked into place in the opening 10 and drawn into alignment with the edges 4 of the saddle-shaped base member 2 being aligned with the inside edges of the opening 10, which essentially seats the device in the proper alignment. Thereafter, the gasket 13 is placed over the hollow stem 3 and moved to the surface of the pipe 12. Thereafter, the collar 14 is placed over the hollow stem 3 and seated on top of the gasket 13. Finally, the locking means 15 is placed over the top of the hollow stem 3 and the threads are engaged whereby, when the locking means 15 is progressively engaged with the hollow stem 3, said locking means draws the saddle-shaped base member towards the edges of the opening 10, bringing the lugs 6 and the lugs 7 towards the interior surface of the pipe 12, thus bringing the lugs 6 and 7, the gasket 13 and the collar 14 into a compressive bearing relationship to the main pipe 12.

Now so that those skilled in the art will understand and appreciate the device and method of the instant invention, the following claims are presented.

I claim:

1. A coupling device capable of being inserted in an opening of a main pipe to form a branch point in the main pipe comprising:
   a stem pipe;
   a flat gasket;
   a collar;
   a locking means;
   said stem pipe comprising an enlarged saddle-shaped base member and a hollow stem integrally surmounted thereon;
   said hollow stem having a base;
   said hollow stem being threaded on its exterior surface
   and having a notch in said threads near its base;
   said enlarged saddle-shaped base member having a top surface which is configured to mate with the interior edges of the opening formed in the main pipe;
   said enlarged saddle-shaped base member having a bottom surface bearing two pair of integral lugs thereon, said lugs extending from diametrically opposed points on the saddle-shaped base member;
   said pairs of lugs being located away from the center of the saddle-shaped base member;
   one such pair of lugs being longer than the other pair of lugs along the diametric linear axis of the coupling and being aligned substantially with the notch at the base of the hollow stem;
   said enlarged saddle-shaped base member being surmounted by a flat gasket, said gasket having a center hole therein to accommodate the hollow stem projecting therethrough;
   said gasket being surmounted by a saddle-shaped collar which coincides with the outside curvature of the main pipe with the gasket therebetween;
   said saddle-shaped collar being surmounted by a threaded locking means which is engageable with the exterior threaded surface of the hollow stem whereby, when the locking means is progressively engaged with the hollow stem, said locking means draws the saddle-shaped base member towards the main pipe edges bringing the lugs, the gasket, and the collar into a compressive bearing relationship to the main pipe.

2. A method of attaching a coupling device capable of being inserted in an opening of a main pipe to form a branch point in the main pipe said coupling device comprising:
   a stem pipe;
   a flat gasket;
   a collar;
   a locking means;
   said stem pipe comprising an enlarged saddle-shaped base member and a hollow stem integrally surmounted thereon;
   said hollow stem being threaded on its exterior surface;
   said enlarged saddle-shaped base member having a top surface which is configured to mate with the interior edges of the opening formed in the main pipe;
   said enlarged saddle-shaped base member having a bottom surface bearing two pair of integral lugs thereon, said lugs extending from diametrically opposed points on the saddle-shaped base member;
   said pairs of lugs being located away from the center of the saddle-shaped base member;
   one such pair of lugs being longer than the other pair of lugs along the diametric linear axis;
   said enlarged saddle-shaped base member being surmounted by a flat gasket, said gasket having a center hole therein to accommodate the hollow stem projecting therethrough;
   said gasket being surmounted by a saddle-shaped collar which coincides with the outside curvature of the main pipe with the gasket therebetween;
   said saddle-shaped collar being surmounted by a threaded locking means which is engageable with the exterior threaded surface of the hollow stem whereby, wherein the method comprises the steps of:
   (I) inserting the longer lugs of the saddle-shaped base member into the main pipe opening;
   (ii) positioning the stem pipe in the main pipe opening by moving the stem pipe against the edge of the main pipe opening near the location of the longer lugs on the saddle shaped base member;
   (III) inserting the shorter lugs of the saddle-shaped base member into the main pipe opening;
   (IV) while maintaining the main stem pipe in the pipe opening:
      (i) surmounting the stem pipe with the flat gasket;
      (ii) surmounting the flat gasket with the collar;
      (iii) surmounting the collar with the locking means by engaging the locking means with the stem pipe threaded exterior surface and
   (V) progressively engaging the hollow stem, whereby the said locking means draws the saddle-shaped base member towards the main pipe edges bringing the lugs, the gasket, and the collar into a compressive bearing relationship to the main pipe, whereby a branch point in the main pipe is formed.

3. In combination:
   a main pipe having an opening with edges, said opening extending through a wall of said main pipe and, said opening containing therein a stem pipe having an exterior threaded surface and a saddle-shaped base member bearing two sets of diametrically opposed integral lugs;
   said stem pipe having surmounted thereon, a flat gasket, a collar, and a locking means, to lock the stem pipe, surmounted by the gasket and collar, in the opening, wherein the saddle-shaped base member is in alignment with the edges of the opening in the main pipe to prevent rotation of the saddle-shaped base member in the opening.

* * * * *